Jan. 5, 1971 — R. ALTSON ET AL — 3,552,814

CAGE FOR ROLLER BEARING

Filed April 30, 1969

INVENTOR
Ralph Altson, deceased,
John A. Altson, &
George R. Altson,
his legal representatives
BY
H. J. Fodale
ATTORNEY

United States Patent Office 3,552,814
Patented Jan. 5, 1971

3,552,814
CAGE FOR ROLLER BEARING
Ralph Altson, deceased, late of Erie County, Ohio, by John A. Altson, Port Jefferson, and George R. Altson, both legal representatives, Rochester, N.Y., assignors to General Motors Corporation, Detroit, Mich., a corporation of Delaware
Filed Apr. 30, 1969, Ser. No. 821,172
Int. Cl. F16c *133/46*
U.S. Cl. 308—217                                    6 Claims

ABSTRACT OF THE DISCLOSURE

A cage for roller bearings is designed with arcuate deformable retaining members spanning the roller pockets adjacent each end of the pockets. The retaining members include a nib which is disposed in a recess in the roller end face to retain the rollers on the cage when the retaining members are deformed. The retaining members are spaced from the cage end rings with the relatively rigid end rings maintaining dimensional control of the cage. A race with two integral shoulders can also be included in the assembly.

---

This invention relates generally to roller bearing cages and more specifically to a one-piece stamped roller bearing cage designed to retain the rollers in unit-handled relationship.

One-piece stamped roller bearing cages in which various portions of the cage have been deformed to protrude into recesses in the end faces of the rollers in order to retain the rollers in unit-handled relationship with the cage have been known including types in which the end rings themselves have been deformed to protrude into the roller recesses. However, in such designs, it is important that the deforming of the cage portions to protrude into the recesses of the end faces do not distort or appreciably effect the geometric accuracy of the cage. Accordingly, it is an object of this invention to provide a one-piece stamped cage in which portions of the cage are deformed to protrude into recesses in the end face of the rollers to retain the rollers without appreciably effecting the geometric accuracy of the cage.

It is another object of this invention to provide a one-piece stamped cage in which portions of the cage are deformed to protrude into recesses in the end face of the rollers to retain the rollers on the cage and in which the span between the cage cross bars are maintained by end rings which in no way are involved in the deformation whereby the running clearance between the cage and the rollers and the geometrical accuracy of the cage is maintained.

It is another object of this invention to provide such a cage in which a race having two integral shoulders may be included in a unit-handled assembly of race, cage and rollers.

The exact nature of this invention as well as other objects and advantages thereof will be readily apparent from consideration of the following specification relating to the annexed drawing in which.

Figure 1:
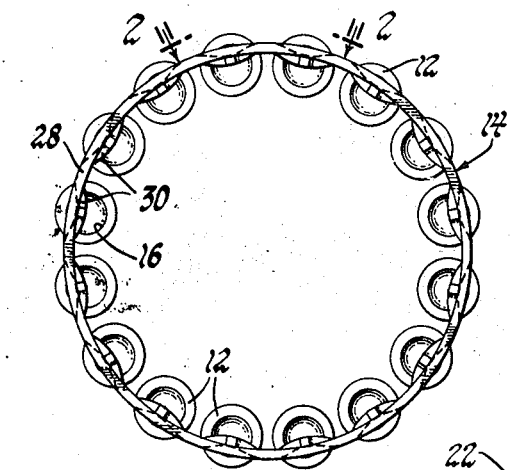
FIG. 1 is an end view of a unit-handled assembly of cage and rollers in accordance with this invention.

The unit-handled assembly of a complement of rollers 12 and a cage indicated generally at 14 in accordance with this invention is shown in FIG. 1. The cage 14 is a one-piece stamped sheet metal cage and is preferably of the type wherein the pockets are stamped out of a sheet metal cup or cylinder although it is contemplated that the cage may be of the ladder type wherein the pockets are punched from a strip of sheet stock which is subsequently rolled into a cylinder and buttwelded.

Figure 3:
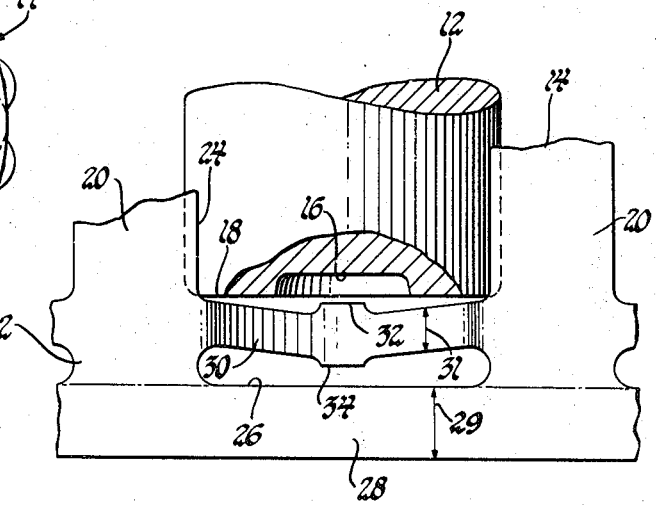
FIG. 3 is a view similar to FIG. 2 except that it shows the condition of the cage before deformation of the retaining portions of the cage to hold the rollers in unit-handled relationship with the cage.

Referring now to FIG. 3, it can be seen that each of the rollers 12 includes a central depression 16 in its end face 18. Although only one end of the roller 12 and its adjacent portion of the cage 14 is shown, it is to be understood that the other end of the roller and the portion of the cage adjacent it is identical.

The cage 14 includes cross bars 20 which together with the annular end portions 22 define roller receiving pockets 24. In stamping out the pockets 24, a slot 26 is also stamped in the annular end portion 22 dividing it into an end ring portion 28 and a retaining portion 30. The retaining portion 30 spans the end of the roller receiving pocket 24 and is spaced from the end ring portion 28. The retaining portion 30 includes a nib 32 facing the end face 18 of the roller in general and aligned with the recess 16 thereof in particular. An outboard nib 34 is also preferably provided for reasons which will hereinafter be more fully apparent. The retaining portion 30 is arcuate in cross section (as shown in FIG. 4) and somewhat V-shaped in its planar projection.

It is to be noted that the cage can be considered as including continuous end rings of substantial width determined by the width 29 of the end ring portions 28. The width 31 of the retaining portion 30 is preferably less than that of end ring width 29. Thus the retaining portion 30 is weaker than the end rings so that upon subsequent deformation, the end ring portion 28 being relatively more rigid will maintain the structural integrity and dimensional control of the cage.

Figure 2:
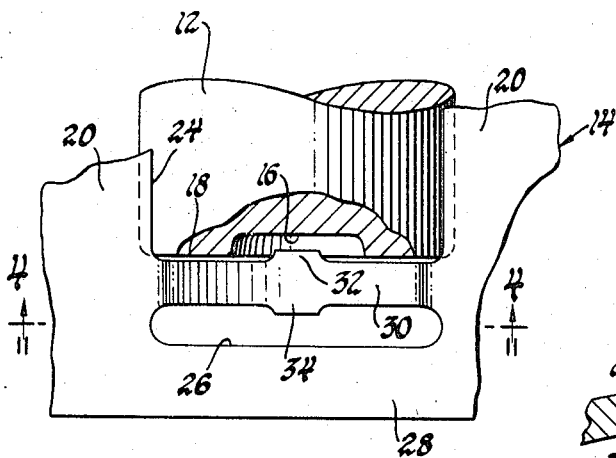
FIG. 2 is a section taken along the line 2—2 of FIG. 1 and looking in the direction of the arrows.

FIG. 2 shows the cage after the retaining portion 30 has been deformed with the nib 32 protruding into the recess 16 in the end face 18 of the roller 12. A similar nib and retaining member on the other side of the roller, not shown, protrudes into a similar recess and, therefore, each of the rollers 12 is maintained in unit-handled relationship with the cage 14. It is to be noted that the retaining portions 30 are not directly connected with what may be considered as continuous end rings of width 29 and, therefore, the dimensional integrity of the cage is not appreciably affected by the deformation of the retaining portions 30. It is also to be noted that the retaining portions 30 in their deformed condition are relatively strong members being more akin to a simple beam by reason of their integration into the cage at both ends. In the past, some comparable structures have been more akin to a cantilevered beam, that is, the retaining members were attached at only one end to the cage.

Figure 4:
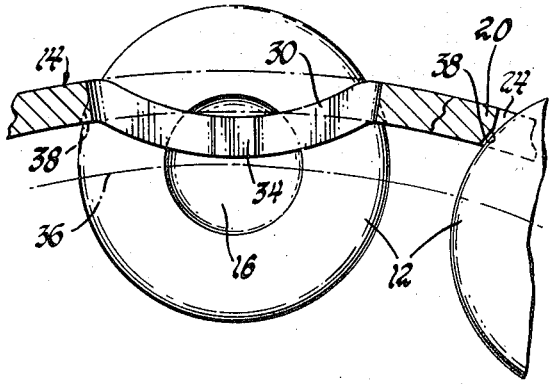
FIG. 4 is a section taken along the line 4—4 of FIG. 2 and looking in the direction of the arrows.

Referring now to FIG. 4, it can be seen that the cage is generally cylindrical in form and located at one side (radially outwardly) of the pitch circle 36 of the rollers 12. The retaining portions 30 are arcuate in cross section and dip inwardly toward the pitch circle 36 but do not cross it so that the rubbing on their side face is unidirectional. The punched cage pockets 24 include guidance surfaces 38 for their entire length to provide improved cage guidance.

Figure 5:
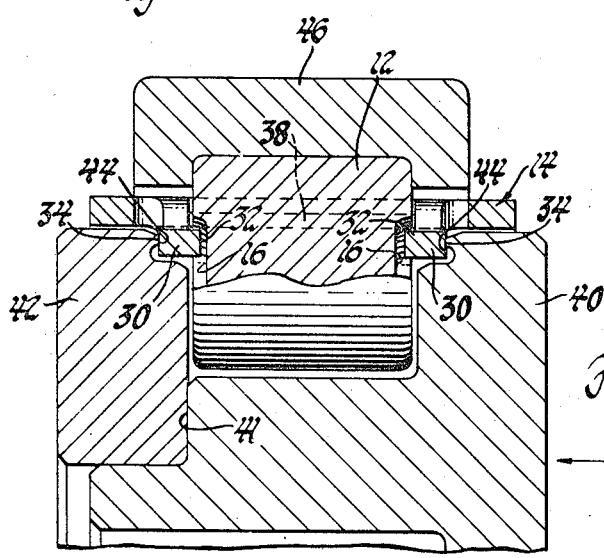
FIG. 5 is a section taken through the axis of a cage in accordance with this invention and showing a typical set of closing dies for deforming the retaining portions of the cage to provide a unit-handled relationship between the cage and rollers and also a double flanged race.

In FIG. 5 is illustrated a typical set of closing dies 40 and 42 for deforming the retaining portions 30 from the condition shown in FIG. 3 to the retaining condition shown in FIG. 2. The die 42 is piloted on the die 40 and limited in its closing direction by the shoulder 41. Each of the closing dies include an annular lip 44 which contacts the outboard nib 34 on each of the retaining portions 30. As the closing dies are moved toward each other, the retaining portions 30 are deformed axially inwardly until the nibs 32 protrude into the recesses 16 of the rollers 12. It is evident from FIG. 5 that a double-flanged race 46 can be included in the unit-handled assembly. This is accomplished by concentrically locating the cage 14 in the outer race 46, inserting the rollers 12 into the cage pockets 24 from the inner diameter of the cage and deforming the retaining portions 30 with the closing dies 40 and 42 to the form shown in FIG. 2.

While a cage assembly especially suitable for use with an outer race has been specifically disclosed, the principles of this invention are obviously applicable to a cage for use with an inner race.

It should be also understood, of course, that the foregoing disclosure relates to only a preferred embodiment of the invention and that it is intended to cover all changes and modifications of the specific example of the invention herein chosen for the purposes of the disclosure, which do not constitute departures from the spirit and scope of the invention.

What is claimed is:

1. A unit-handled assembly comprising,
    a one-piece cylindrical cage having end rings with cross bars extending between said end rings to form a plurality of circumferentially spaced windows,
    a plurality of rollers disposed in said windows with their axes circumferentially spaced in a pitch circle,
    an identation in each end of said rollers,
    a retaining member integral with said cage extending circumferentially across each window adjacent each end thereof, each of said retaining members being spaced from said end rings, respectively, and
    a nib on each of said retaining members disposed in said roller indentations whereby said rollers are in unit-handled relationship with said cage.

2. The unit-handled assembly as defined in claim 1 wherein said cage is on one side of said pitch circle and further including a race having integral thrust shoulders, said race being on the same side of said pitch circle as said cage whereby said race and rollers are in unit-handled relationship with said cage.

3. An assembly comprising,
    a one-piece generally cylindrical cage of substantially uniform thickness, said cage including,
        end rings with cross bars extending between said end rings to form a plurality of circumferentially spaced windows,
        a retaining member extending circumferentially across each window adjacent each end thereof and spaced from said end ring, each of said retaining members being arcuate in cross section and having an axial length less than the axial length of said end rings for a major portion of its circumferential length,
    a central axial nib on each retaining member,
    a plurality of rollers having a central indentation in each end thereof, and
    a roller being disposed in each window with one of said nibs projecting into each indentation thereof whereby said cage and rollers are in unit-handled relationship.

4. The unit-handled assembly as defined in claim 3 further including a race having integral thrust shoulders, in unit-handled relationship with said cage.

5. A unit-handled assembly comprising,
    a plurality of circumferentially spaced rollers with their axes located in a pitch circle, each of said rollers having a coaxial indentation in each end thereof,
    a sheet metal, unitary cage having annular end portions with cross bars extending therebetween to form roller receiving windows, and
    a roller disposed in each window,
said windows having a circumferential length less than the diameter of said rollers whereby said cage is guided on said rollers and is disposed on one side of said pitch circle, said annular end portions having a plurality of elongated slots corresponding in number to said windows, said slots dividing said annular end portions into a substantially rigid and ring portion and inboard deformable retaining members of smaller cross section than said end ring portions, said retaining members having nibs projecting into said indentations whereby said rollers are retained in said windows.

6. The unit-handled assembly as defined in claim 5 wherein said cage is on one side of said pitch circle and further including a race having integral thrust shoulders, said race being on the same side of said pitch circle as said cage whereby said race and rollers are in unit-handled relationship with said cage.

References Cited
UNITED STATES PATENTS 1,922,805  8/1933  Heim _____ 308—217

FRED C. MATTERN, Jr., Primary Examiner

F. SUSKO, Assistant Examiner